United States Patent [19]

Magera

[11] 4,312,385
[45] Jan. 26, 1982

[54] REFRACTORY INSULATION FOR COOLING PIPES IN REHEATING FURNACES

[76] Inventor: Matthias Magera, Cosa Mesa, Calif.

[21] Appl. No.: 117,264

[22] Filed: Jan. 31, 1980

[51] Int. Cl.³ .......................... F16L 9/22; F27D 3/02
[52] U.S. Cl. .................................... 138/149; 138/147; 138/158; 138/161; 432/234
[58] Field of Search ............... 138/147, 149, 158, 160, 138/161, 156, 157, 175, 99, 174; 432/233, 234

[56] References Cited

U.S. PATENT DOCUMENTS

| | | | |
|---|---|---|---|
| 2,352,145 | 6/1944 | Wright | 138/147 X |
| 2,693,352 | 11/1954 | Bloom | 432/234 |
| 3,804,585 | 4/1974 | Twort | 138/147 X |
| 4,182,609 | 1/1980 | Hovis et al. | 432/234 |
| 4,189,301 | 2/1980 | Twort | 432/252 |
| 4,225,307 | 9/1980 | Magera | 138/147 X |

FOREIGN PATENT DOCUMENTS 1442921 7/1976 United Kingdom ............... 432/234

Primary Examiner—James E. Bryant, III
Attorney, Agent, or Firm—William J. Ruano

[57] ABSTRACT

Pipe insulation for water cooled support piping in a reheating furnace comprising refractory semicircular, pivotal complementary sleeves having wire reinforcement embedded in the sleeve refractory material and wherein the wire may be prestretched and located on the inner surface of the refractory insulation to directly contact, metal-to-metal, the outer surface of the cooling pipe. The reinforcing reticulations of the wire are at an angle to the longitudinal axis of the refractory sleeve. They enable stressing of the wire reinforcement simply by turning nuts of J-bolts, eliminating the requirement for welding of the reinforcing wire to the pipe. Longitudinal shoulders on the refractory protect the bolts from the effect of heat of the slab. The construction is such that tightening of the bolts and stressing of the reinforcing wire will cause no relative movement between the wire and refractory insulation.

2 Claims, 6 Drawing Figures

REFRACTORY INSULATION FOR COOLING PIPES IN REHEATING FURNACES

This invention relates to a reinforced refractory pipe insulating structure for use in reheating furnaces for heating metal billets and the like. It is useful for reheating furnace cross overs and risers associated with the skid rails.

An outstanding disadvantage of formerly used reinforced pipe insulation for skid rails and the like in the prior art, as exemplified U.S. Pat. No. 2,693,352 of Nov. 2, 1954, is that the reinforcing wire must be welded to the pipe. This requires a welder to be on the job with welding equipment and material with expensive welding operations to be performed. Moreover, the internal structure of the reinforcement is not adequately protected from the effects of the heat provided by the moving hot slab.

Still another disadvantage of insulating devices of this kind is that the inventory requirement is very expensive since the two halves of the pipe insulation are not identical for complementary use, therefore requiring inventory of two different constructions of the semi-circular portions.

Still another disadvantage is that the reinforcing wire is of such construction as to become easily loosened, if it is embedded centrally of the insulation, because the vibration accompanying the slab movement will effect relative movement between the reinforcing wire and insulation and cause rupturing of the insulation and breakdown of the insulating sleeve.

An object of my invention is to overcome the above named disadvantages of prior used reinforced refractory pipe insulation for cross-overs and the like.

A more specific object of the invention is to provide a refractory cylinder including a metal mesh reinforcement that is prestressed and that is partially exposed to the inner surface of the sleeve so as to make a direct metal-to-metal contact with the cold water circulating pipe so as to effectively cool the metal mesh and so as to avoid any relative movement of the refractory or mesh and the chain-like reinforcement.

Other objects and advantages of the invention will become more apparent from a study of the following description taken with the accompanying drawings wherein.

Figure 1:
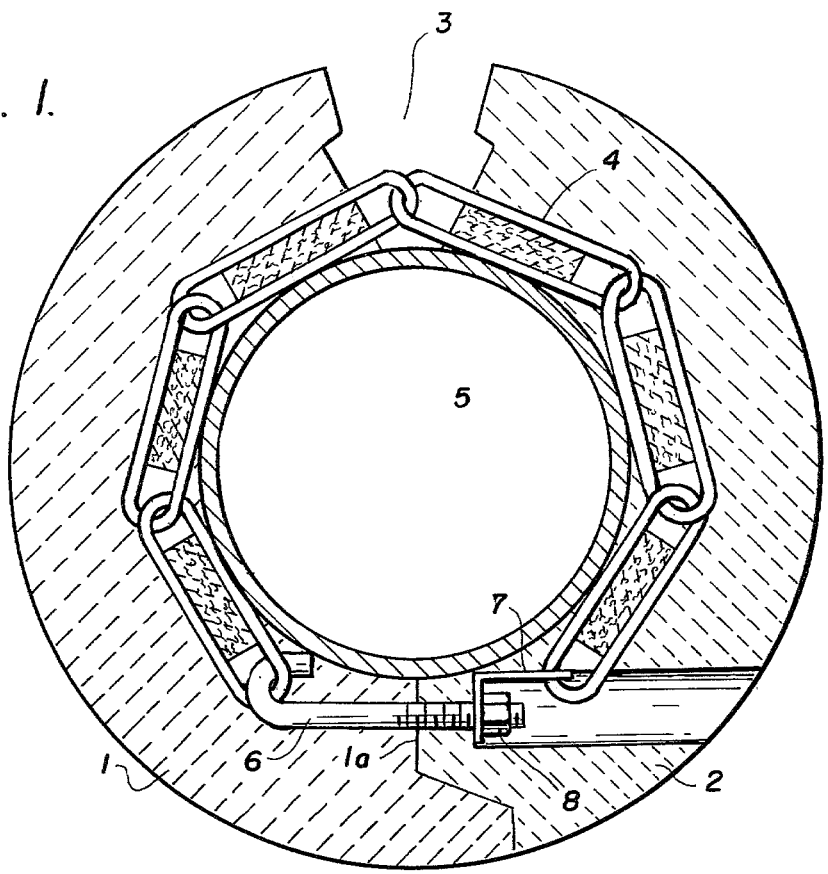
FIG. 1 is a cross-sectional view of a pivotal, reinforced refractory pipe embodying my invention and also useful for crossovers and risers.
Figure 2:
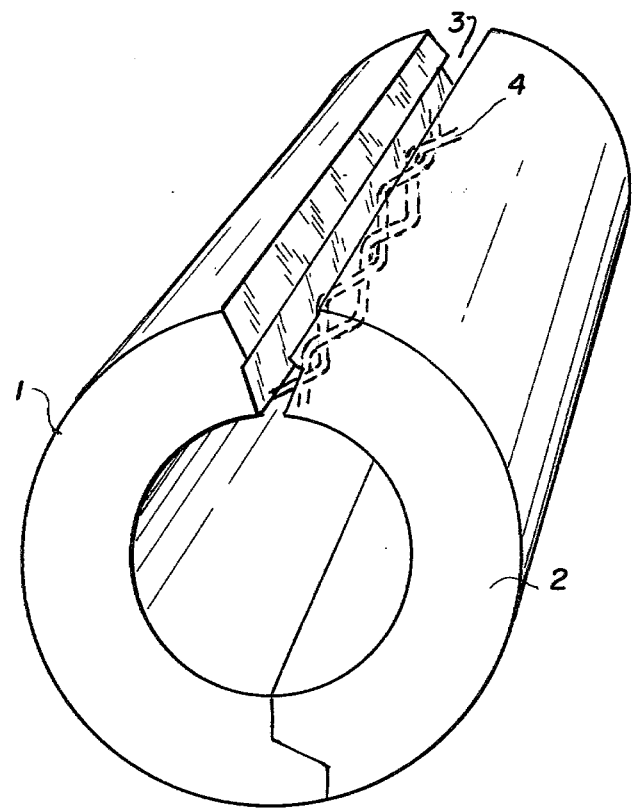
FIG. 2 is a perspective view thereof.

Referring more particularly to FIGS. 1 and 2 of the drawing, numerals 1 and 2 are complementary, substantially semi-cylindrical portions or sleeves of refractory insulating material such as alumina, separated by a gap 3 in order to provide space for a pivotal movement of portions 1 and 2. A stainless steel mesh 4, simulating wire fencing, is provided closely adjacent to and partly exposed in the interior wall surface of refractory portions 1 and 2 to provide direct metallic contact with the water cooled pipe 5 which extends, there-through. The mesh extends longitudinally throughout the length of the pipe, as partly shown in FIG. 2. If desired, ceramic fiber strips may be inserted inside the links of mesh 4 as shown by strips 9 in FIG. 3.

A J bolt 6 is provided which hooks onto one end of the mesh 4 and which is embedded in refractory semi-cylinder portion 1, exposing only the threaded portion beyond wall 1a. Hooked onto or welded to the other end of mesh 4 is a tab 7 which has a right angular portion with a hole surrounding the exposed threaded shank of J bolt 6. By tightening a nut 8, the ends of the mesh 4 are brought closer together under tension so as to prestress the mesh throughout its length and thereby resist any tendency of movement of the mesh as a consequence of high heat exteriorly of the refractory skid pipe 1, 2.

In operation, when it is desired to remove the refractory pipe 1, 2, it is necessary merely to unscrew nut 8 so as to allow both semi-cylinder portions 1 and 2 to move apart with the linkage in space 3 acting as a pivot until the space 3 is closed by contact of the confronting wall surfaces of refractory portions 1 and 2. It will be understood that the J bolt assembly also is provided at the other end of the said pipe and perhaps at intermediate points to stress the entire mesh 4.

Figure 3:
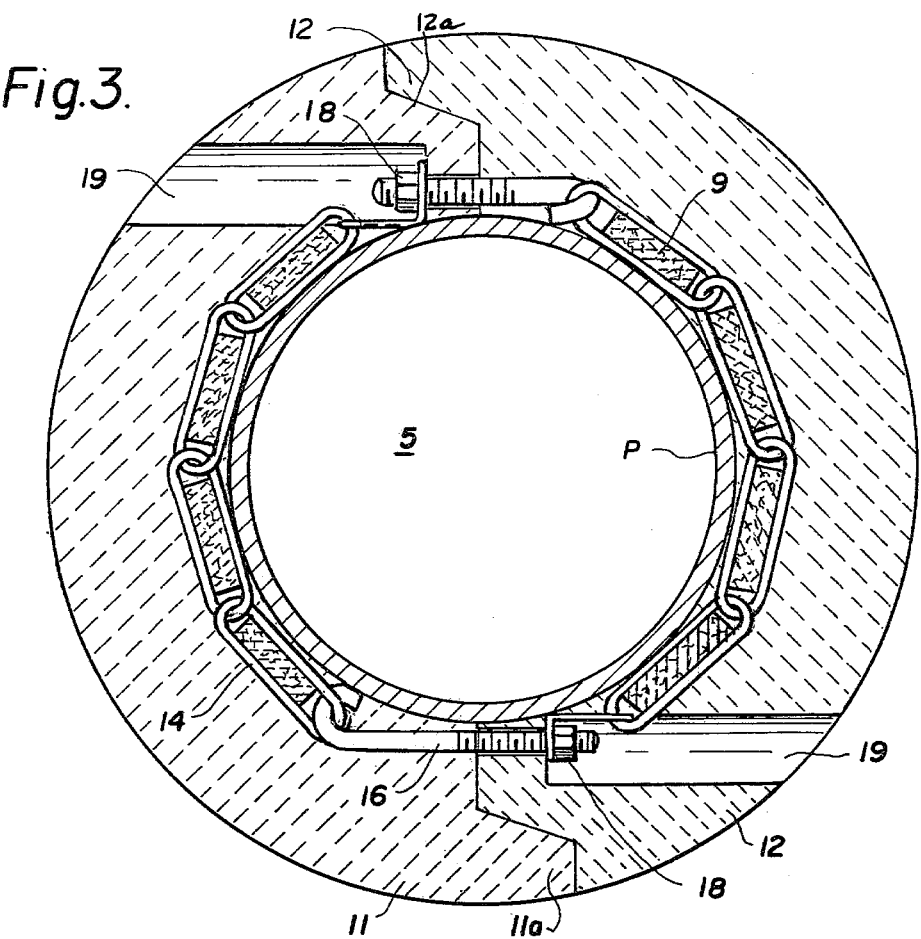
FIG. 3 is a cross-sectional view of a modification of my invention.

FIG. 3 shows a modification wherein refractory cylindrical halves 11 and 12 are provided with extensions 11a and 12a which form protective barriers against the direct entry of heat to the exposed threaded surfaces of the J bolt 16 which hooks onto the mesh 14 of stainless steel or other high heat resistant metal.

Ceramic fiber strips or bats 9 are provided in the mesh 14 to provide additional heat insulation. By unscrewing nuts 18 which are formed in recesses or wells 19 in the refractory halves, easy access is provided for a tool to turn the nut 18 and tighten the mesh 14 to effect prestressing thereof. The mesh has portions which are exposed in the inner surface of the refractory halves 11 and 12 to provide metal contact with the pipe 5 which conducts cooling water for the refractory halves.

Figure 4:
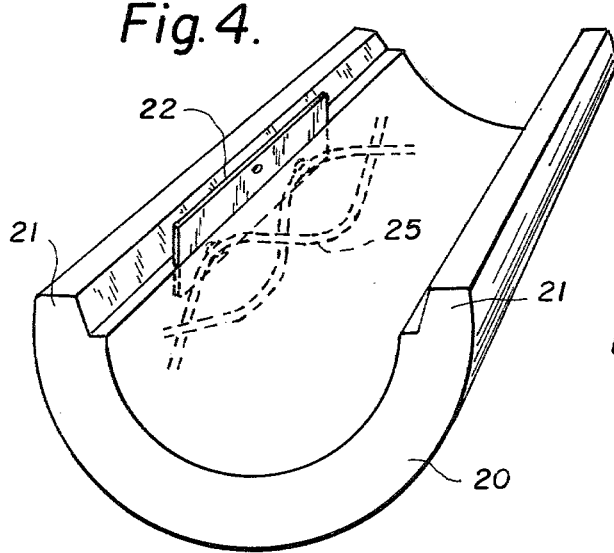
FIG. 4 is a perspective view of a further modification of one of the semi-circular portions of the refractory pipe.
Figure 5:
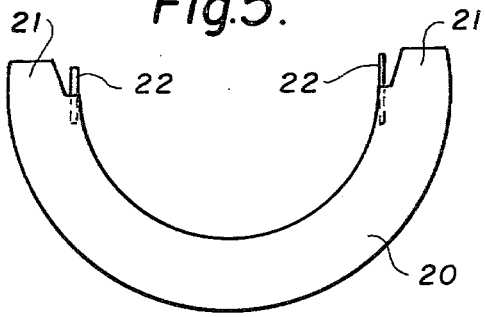
FIG. 5 is a side view thereof.
Figure 6:
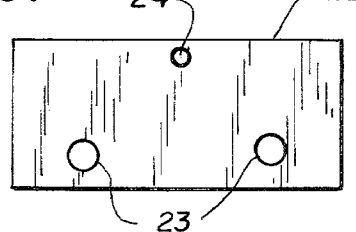
FIG. 6 is a plan view of the metallic tab shown in FIG. 4.

FIGS. 4, 5 and 6 show a modification and the construction of the welding tabs 22 which are secured to the mouth portion of the refractory half so that the mesh may be connected thereto by simply passing through holes 23. This provides a strong, firm support for the mesh. Tabs 22 are welded to pipe 5. Sleeve 20 (21) may be extended up to about 190° and either welded or not welded to the pipe to serve as a skid or on an outside area of crossover. With space 3 and mesh 4, it may be increased to 270°.

Thus it will be seen that I have provided a highly efficient, refractory cylinder halves useful as a crossover or similar element exposed to extremely high temperatures; furthermore, I have provided a construction made of relatively available standard parts that can be easily and quickly assembled and yet provide a very strong structure of pre-stressed mesh that will dissipate heat by metallic contact with the cooling pipe so as to prevent premature breakdown of the refractory which often occurs in presently used refractory halves.

While I have illustrated and described several embodiments of my invention, it will be understood that these are by way of illustration only and that various changes and modifications may be contemplated in my invention and within the scope of the following claims.

I claim:

1. For use in combination with a water flowing pipe, a refractory insulating sleeve of less than 360° substantially surrounding said pipe made up of two substantially semi-circular refractory insulating sleeves of less than 180° each, two of the ends of said semi-circular sleeves being in mating relationship, the other two ends thereof being separated by a gap, a metallic wire mesh for surrounding and contacting the outer surface of said pipe with the portion in said gap acting as a pivot for said substantially semi-circular sleeves, said gap being devoid of any material interfering with the free pivotal movement of said pivot portion of said wire mesh to allow separation from said water flowing pipe, the other two ends of said refractory insulating sleeves being mated together, readily detachable fastening means embedded in the other two end portions for holding together end portions of said wire mesh and for pre-stressing said wire mesh.

2. The sleeve construction recited in claim 1 wherein said fastening means comprises a J-bolt in one of said two end portions and a threaded shank having an exposed portion in the other end portion to enable screwing on a nut, a tab held by said nut and fastened to the other end of said wire mesh to effect pre-stressing of said wire mesh.

* * * * *